United States Patent US 9,647,818 B2
Han et al.
Date of Patent: May 9, 2017

(54) APPARATUS AND METHOD FOR SINGLE-TONE DEVICE DISCOVERY IN WIRELESS COMMUNICATION NETWORKS

(71) Applicant: Intel IP Corporation, Santa Clara, CA (US)

(72) Inventors: Seunghee Han, Kyoungkido (KR); Apostolos Papathanassiou, San Jose, CA (US); Hong He, Beijing (CN); Jong-Kae Fwu, Sunnyvale, CA (US); Alexei Vladimirovich Davydov, Nizhny Novgorod (RU)

(73) Assignee: Intel IP Corporation, Santa Clara, CA (US)

(*) Notice: Subject to any disclaimer, the term of this patent is extended or adjusted under 35 U.S.C. 154(b) by 48 days.

(21) Appl. No.: 14/142,021

(22) Filed: Dec. 27, 2013

(65) Prior Publication Data
US 2014/0185550 A1 Jul. 3, 2014

Related U.S. Application Data

(60) Provisional application No. 61/748,706, filed on Jan. 3, 2013, provisional application No. 61/806,821, filed on Mar. 29, 2013.

(51) Int. Cl.
*H04L 5/00* (2006.01)
*H04B 1/7143* (2011.01)

(52) U.S. Cl.
CPC ......... *H04L 5/0058* (2013.01); *H04B 1/7143* (2013.01); *H04B 2201/71632* (2013.01); *H04L 5/0012* (2013.01)

(58) Field of Classification Search
None
See application file for complete search history.

(56) References Cited

U.S. PATENT DOCUMENTS 9,345,046 B2  5/2016  Li et al.
2006/0268675 A1*  11/2006  Cho .................. H04B 1/713
                                                          370/210

(Continued)

FOREIGN PATENT DOCUMENTS

CN  104995961 A  10/2015
CN  105075370 A  11/2015

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, figure 5.3.3.1-1., [Online]. Retrieved from the Internet: <http://www.3gpp.org/DynaReport/36331.htm>, (Mar. 18, 2013), 108, 129.

(Continued)

*Primary Examiner* — Vinncelas Louis
(74) *Attorney, Agent, or Firm* — Schwegman Lundberg & Woessner, P.A.

(57) ABSTRACT

Embodiments of wireless communication devices and methods for device discovery is generally described herein. Some of these embodiments describe an apparatus having processing circuitry arranged to configure a single-tone discovery signal for transmission in a symbol in a transmission opportunity based on an assignment pattern. The assignment pattern may define frequency positions, for a set of transmission opportunities, at which the apparatus shall transmit discovery signals in the corresponding transmission opportunity. The apparatus may have physical layer circuitry arranged to transmit the single-tone discovery signal in the corresponding transmission opportunity. Other methods and apparatuses are also described.

13 Claims, 13 Drawing Sheets

(56) References Cited

U.S. PATENT DOCUMENTS

| | | |
|---|---|---|
| 2009/0005057 A1 | 1/2009 | Lee et al. |
| 2009/0040955 A1 | 2/2009 | Jung et al. |
| 2009/0116573 A1* | 5/2009 | Gaal ............... H03M 13/2703 375/267 |
| 2009/0290555 A1 | 11/2009 | Alpert et al. |
| 2010/0130237 A1 | 5/2010 | Kitazoe et al. |
| 2010/0208698 A1 | 8/2010 | Lu et al. |
| 2010/0267407 A1 | 10/2010 | Liao et al. |
| 2010/0310004 A1* | 12/2010 | Li ...................... H04L 27/2637 375/295 |
| 2011/0188376 A1 | 8/2011 | Stupar et al. |
| 2012/0106475 A1 | 5/2012 | Jung |
| 2012/0209952 A1 | 8/2012 | Lotfallah et al. |
| 2012/0264412 A1 | 10/2012 | Tervonen et al. |
| 2012/0275365 A1 | 11/2012 | Anderson et al. |
| 2013/0005332 A1 | 1/2013 | Sedlacek et al. |
| 2013/0012182 A1 | 1/2013 | Liao |
| 2014/0031028 A1* | 1/2014 | Yamada ............... H04W 8/005 455/419 |
| 2014/0086226 A1 | 3/2014 | Zhao et al. |
| 2014/0192651 A1 | 7/2014 | Sun et al. |
| 2014/0200000 A1 | 7/2014 | Jin et al. |
| 2014/0241333 A1 | 8/2014 | Kim et al. |
| 2014/0295858 A1 | 10/2014 | Li et al. |
| 2016/0021606 A1 | 1/2016 | Gupta |
| 2016/0050246 A1 | 2/2016 | Liao et al. |
| 2016/0057701 A1 | 2/2016 | Choi et al. |

FOREIGN PATENT DOCUMENTS

| | | |
|---|---|---|
| CN | 105103634 A | 11/2015 |
| CN | 106060912 A | 10/2016 |
| EP | 2979414 A | 2/2016 |
| JP | 20104587 A | 2/2010 |
| TW | 201445991 A | 12/2014 |
| TW | 201446039 A | 12/2014 |
| TW | I526062 B | 3/2016 |
| TW | I528851 B | 4/2016 |
| WO | WO-2009127238 A1 | 10/2009 |
| WO | WO-2011050835 A1 | 5/2011 |
| WO | WO-2012090401 A1 | 7/2012 |
| WO | WO-2012110093 A1 | 8/2012 |
| WO | WO-2012111993 A2 | 8/2012 |
| WO | WO-2012134530 A1 | 10/2012 |
| WO | WO-2012138091 A2 | 10/2012 |
| WO | WO-2012167106 A1 | 12/2012 |
| WO | WO-2013017006 A1 | 2/2013 |
| WO | WO-2013022220 A1 | 2/2013 |
| WO | WO-2013042330 A1 | 3/2013 |
| WO | WO-2014158235 A1 | 10/2014 |
| WO | WO-2014158264 A1 | 10/2014 |
| WO | WO-2014158268 A1 | 10/2014 |
| WO | WO-2014158274 A1 | 10/2014 |

OTHER PUBLICATIONS

"U.S. Appl. No. 14/124,217, Preliminary Amendment filed Dec. 5, 2013", 3 pgs.
"Discussion and Recommendation for D2D channel modelling", NEC Group, R1-130376, 3GPP TSG RAN WG1 Meeting #72, (2013), 1-8.
"International Application Serial No. PCT/US2013/068766, International Search Report mailed Feb. 21, 2014", 3 pgs.
"International Application U.S. Appl. No. PCT/US2013/068766, Written Opinion mailed Feb. 21, 2014", 5 pgs.
"International Application Serial No. PCT/US2013/077142, International Search Report mailed Apr. 25, 2014", 4 pgs.
"International Application Serial No. PCT/US2013/077142, Written Opinion mailed Apr. 25, 2014", 5 pgs.
"International Application Serial No. PCT/US2013/077255, International Search Report mailed Apr. 21, 2014", 3 pgs.
"International Application Serial No. PCT/US2013/077255, Written Opinion mailed Apr. 21, 2014", 6 pgs.
"International Application Serial No. PCT/US2013/077764, International Search Report mailed Apr. 24, 2014", 3 pgs.
"International Application Serial No. PCT/US2013/077764, Written Opinion mailed Apr. 24, 2014", 4 pgs.
Alcatel-Lucent, et al., "LTE device to device evaluation methodology", R1-120469, 3GPP TSG-RAN1 Meeting #72, (2013), 1-7.
Miller, K., et al., "Adaptation algorithm for adaptive streaming over HTTP", 2012 19th International Packet Video Workshop (PV), (2012), 173-178.
New Postcom, "Evaluation scenarios and channel models for D2D communications", R1130154, 3GPP TSG-RAN1 Meeting #72, (2013), 1-5.
Nokia, et al., "On LTE D2D Methodologies and Metrics", R1-130501, 3GPP TSG RAN WG1 Meeting #72, (2013), 1-4.
"U.S. Appl. No. 14/124,217, Final Office Action mailed Sep. 17, 2015", 10 pgs.
"U.S. Appl. No. 14/124,217, Non Final Office Action mailed Jun. 30, 2015", 9 pgs.
"U.S. Appl. No. 14/124,217, Notice of Allowance mailed Jan. 14, 2016", 8 pgs.
"U.S. Appl. No. 14/124,217, Response filed Aug. 21, 2015 to Non Final Office Action mailed Jun. 30, 2015", 12 pgs.
"U.S. Appl. No. 14/124,217, Response filed Dec. 17, 2015 to Final Office Action mailed Sep. 17, 2015", 13 pgs.
"Application Serial No. PCT/US2013/068766, International Preliminary Report on Patentability mailed Oct. 8, 2015", 7 pgs.
"Application Serial No. PCT/US2013/077142, International Preliminary Report on Patentability mailed Oct. 8, 2015", 7 pgs.
"Application Serial No. PCT/US2013/077764, International Preliminary Report on Patentability mailed Oct. 8, 2015", 6 pgs.
"International Application Serial No. PCT/US2013/077255, International Preliminary Report on Patentability mailed Oct. 8, 2015", 8 pgs.
"Taiwanese Application Serial No. 103111024, Office Action mailed Jul. 23, 2015", w/ English Translation, 11 pgs.
"Taiwanese Application Serial No. 103111024, Response filed Oct. 6, 2015 to Office Action mailed Jul. 23, 2015", w/ English Claims, 19 pgs.
"Taiwanese Application Serial No. 103111080, Office Action mailed Oct. 28, 2015", w/ English Translation of Search Report, 10 pgs.
"WLAN Network Selection Based on ANDSF", 3GPP SA WG2 Meeting S2-130165, Qualcomrn incorporated, AT&T, (Jan.-Feb. 1, 2013).
Huawei, Hisilicon, "Solutions for Interaction between WLAN network selection and network-provided policies for WLAN selection", 3GPP SA WG2 Meeting S2-130125, Broadcom Corporation, (Jan.-Feb. 1, 2013).
U.S. Appl. No. 14/778,705, filed Sep. 21, 2015, Quality-Aware Rate Adaptation Techniques for Dash Streaming.
U.S. Appl. No. 14/776,069, filed Sep. 14, 2015, Control of WLAN Selection Policies in Roaming Scenarios.
U.S. Appl. No. 14/779,024, filed Sep. 22, 2015, Extended Paging Discontinuous Reception (DRX) Cycles in Wireless Communication Networks.
"3rd Generation Partnership Project; Technical Specification Group Core Network and Terminals; Mobile radio interface Layer 3 specification; Core network protocols; Stage 3 (Release12)", 3GPP Standard; 3GPP TS 2 4 .0 0 8 , 3rd Generation Partnership Project (3GPP), Mobile Competence Centre ; 650, Route Deslucioles ; F-06921 Sophia-Antipolis Cedex; France,, (Dec. 19, 2012), 252 pgs.
"3rd Generation Partnership Project; Technical Specification Group Services and System Aspects; Machine-Type and other Mobile Data Applications Communications Enhancements (Release12)", 3GPP Standard; 3GPP TR 2 3 .8 8 7 , 3rd Generation Partnership Project (3GPP), Mobile Competence Centre ; 650, Route Des Lucioles ; F-06921 Sophia-Antipolis Cedex; France, (Dec. 18, 2012), 90 pgs.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 11)", 3GPP Standard; 3GPP TS 26.247, 3rd Generation Partnership

(56) References Cited

OTHER PUBLICATIONS

Project (3GPP), Mobile Competence Centre ; 650, Route Des Lucioles ; F-06921 Sophia-Antipolis Cedex ; France, vol. SAWG4, No. V 11.1,0, XP050691164, Feb. 5, 2012), 1-113.
"U.S. Appl. No. 14/776,069, Non Final Office Action mailed Nov. 17, 2016", 17 pgs.
"European Application Serial No. 13880537.9, Extended European Search Report mailed Oct. 31, 2016", 8 pgs.
"European Application Serial No. 13880622.9, Extended European Search Report mailed Nov. 7, 2016", 11 pgs.
"European Application Serial No. 13880623.7, Extended European Search Report mailed Oct. 31, 2016", 8 pgs.
"Extending idle mode DRX cycle by using NAS procedures", Samsung:3GPP Draft; S2-124264 UEPCOP Solution_R2, 3rd Generation Partnership Project (3GPP), Mobile Competence Centre ; 650, Route Des Lucioles ; F-06921 Sophia-Antipolis Cedex; France, (Nov. 6, 2012), 4 pgs.
"Introduction of longer SFN length for MTC", Samsung: 3GPP Draft; R2-100331, 3rd Generation Partnership Project (3GPP), Mobile Competence Centre ; 650, Route Deslucioles ; F-06921 Sophia-Antipolis Cedex; France, (Jan. 12, 2010), 2 pgs.
"Taiwanese Application Serial No. 103111080, Response filed Apr. 27, 2016 to Office Action mailed Oct. 28, 2015", (English Translation of Claims), 68 pgs.
Huysegems, Raf, et al., "Session reconstruction for HTTP adaptive Streaming: Laying the foundation for network-based QoE monitoring", Quality of Service (IWQOS), IEEE 20th International Workshop on, IEEE, XP032207367, DOI: 10.1109/IWQOS.2012. 6245987 ISBN: 978-1-4673-1296-7, (Jun. 4, 2012), 1-9.

\* cited by examiner

US 9,647,818 B2

APPARATUS AND METHOD FOR SINGLE-TONE DEVICE DISCOVERY IN WIRELESS COMMUNICATION NETWORKS

PRIORITY APPLICATION

This application claims priority under 35 U.S.C. §119(e) to U.S. Provisional Patent Application Ser. No. 61/748,706, filed Jan. 3, 2013, and to U.S. Provisional Patent Application Ser. No. 61/806,821, filed Mar. 29, 2013, both of which are incorporated herein by reference in their entirety.

TECHNICAL FIELD

Embodiments pertain to wireless communications. Some embodiments pertain to wireless communications directly between two or more pieces of user equipment.

BACKGROUND

User Equipment (UE), including mobile devices such as phones, tablets, e-book readers, laptop computers, and the like, have become increasingly common. Accompanying the increase of usage of such devices has been an increase in the usage of proximity-based applications and services. Proximity-based applications and services are based on the awareness that two or more devices/users are close to one another and desire to communicate to each other. Exemplary proximity-based applications and services include social networking, mobile commerce, advertisement, gaming, and the like. Current systems for providing proximity-based applications may suffer from performance and interference-based problems.

DETAILED DESCRIPTION

Proximity-based applications and services represent a fast growing social and technological trend that may have a major impact on the evolution of cellular wireless/mobile broadband technologies. These services are based on awareness that two devices or two users are close to each other and, thus, may be able to directly communicate with each other. Proximity-based applications can include social networking, mobile commerce, advertisement, gaming, etc. These services and applications stimulate the design and development of a new type of device to device (D2D) communication that can be integrated into current and next generation mobile broadband networks such as LTE and LTE-Advanced.

By leveraging direct connectivity between two devices in a network, D2D communication can enable machines to communicate directly with one another.

Existing mobile broadband networks were designed to optimize performance mainly for human type of communications and thus are not optimized for D2D specific requirements. For example, existing mobile networks do not support the establishment of direct links between two devices. The efficient support and seamless integration of D2D communication in current and future mobile broadband technologies can encourage enhancements or modifications across different layers (e.g., PHY and MAC) in order to optimally address the future D2D demands, meet performance requirements, and overcome technical challenges.

Figure 1:
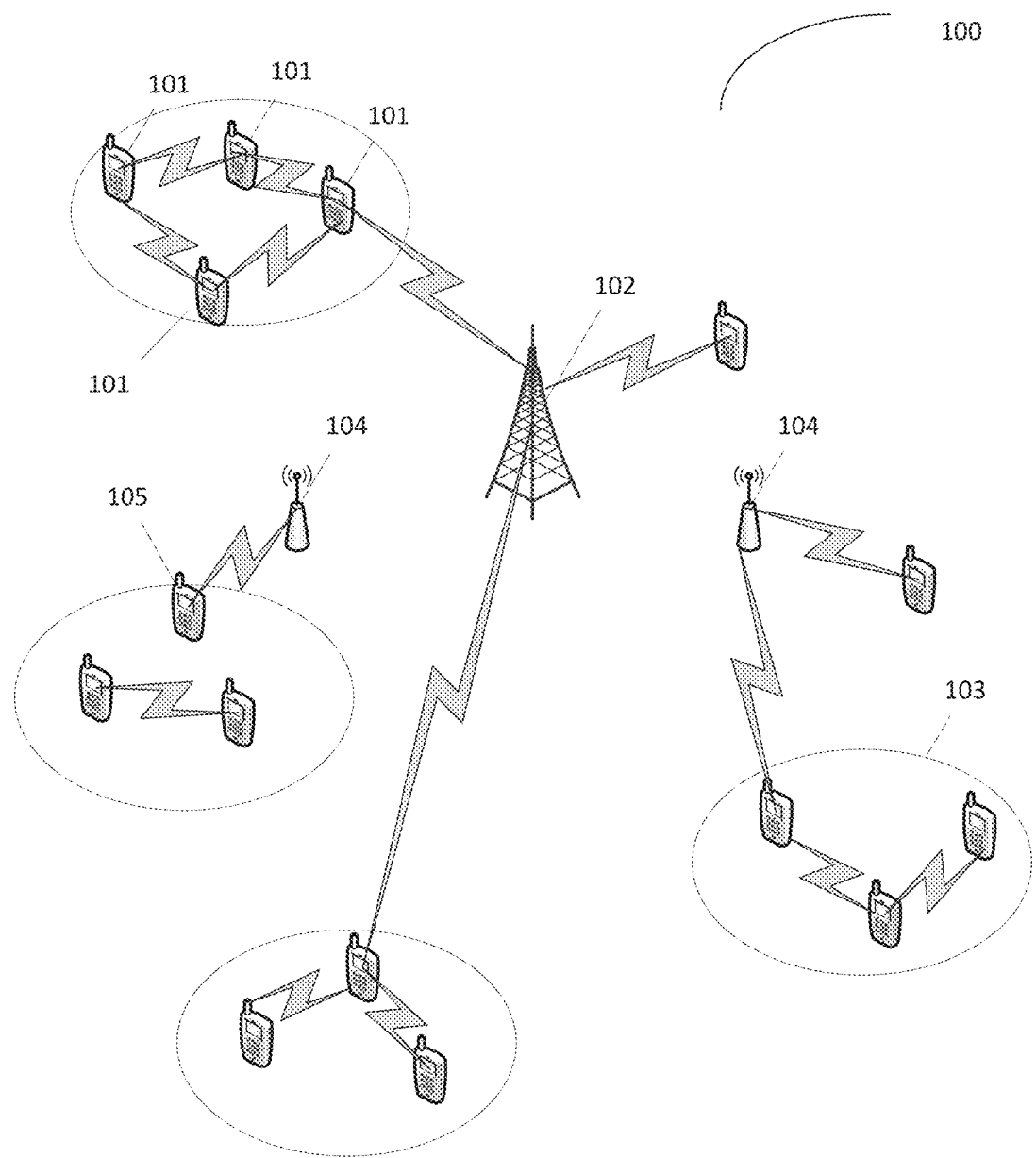
FIG. 1 illustrates an example wireless system including device-to-device users operating and coexisting with traditional cellular users.

In some embodiments, D2D users can operate in a co-existing mode and reuse the spectrum with other cellular users. FIG. 1 illustrates an example wireless system 100 including D2D users (a typical few labeled 101) operating and coexisting with traditional cellular users. Unlike the existing traditional LTE network infrastructure, D2D users 101 do not necessarily need to communicate via the central coordinator (eNodeB) 102. In some embodiments, the D2D users 101 can communicate directly with each other or through hops 103 of other D2D users. When D2D communication shares the same resources with the mobile broadband system, certain functions can still be controlled and coordinated by the eNodeB 102 of the mobile broadband network such as when centralized control offers more benefits.

In some embodiments, proximity sensing methods can be implemented by the network through monitoring the UE attachment/association to a particular cell or using location based services and protocols. In addition to these traditional methods, new proximity based functionality can be added to the functions of the D2D coordinator 105. For example, a special device discovery zone can be allocated in the D2D transmission region where device discovery signaling is used to assist in D2D cluster organization and D2D link establishment. A special discovery signal transmission interval can be introduced in the D2D transmission region for that purpose. Additionally, proximity sensing can be based on D2D link quality measurements.

Small cells using low power nodes may help operators handle increased mobile traffic. A low-power node may transmit using less power than nodes of macro node and base station (BS) classes. For example a home eNodeB (e.g., pico eNodeB or femto eNodeB) 104 may serve as a low-power node in some embodiments. By providing small cell (e.g. home eNodeB 104) enhancements, some embodiments may provide improved performance and reduced interference for both indoor and outdoor hotspots.

Small cell enhancement may be provided either with or without coverage by a macro eNodeB (e.g. eNodeB 102). Accordingly, two or more carrier frequencies may be used for a UE 111 that is served by multiple eNodeBs, pico eNodeBs, home eNodeBs, etc. Embodiments may provide small cell enhancements in both indoor and outdoor deployments, in sparse and dense cells, and with both non-ideal and close-to-ideal backhaul.

Small cell enhancement according to some embodiments should improve network energy efficiency for systems of most levels of complexity and with traffic characteristics according to characteristics currently seen in small cells. In some embodiments, one or more small cells can be placed in a dormant mode such that some small cells do not serve any active users, in order to maintain network energy efficiency while maintaining thresholds of user throughput and capacity per unit area.

Some embodiments provide for discovery mechanisms between devices (e.g., D2D discovery) and between home eNodeBs and other small cells and user devices (e.g., small cell discovery).

Embodiments can be applied in orthogonal frequency-division multiplexing (OFDM)-based systems and in single-carrier frequency division multiple access (SC-FDMA)-based systems.

Figure 2:
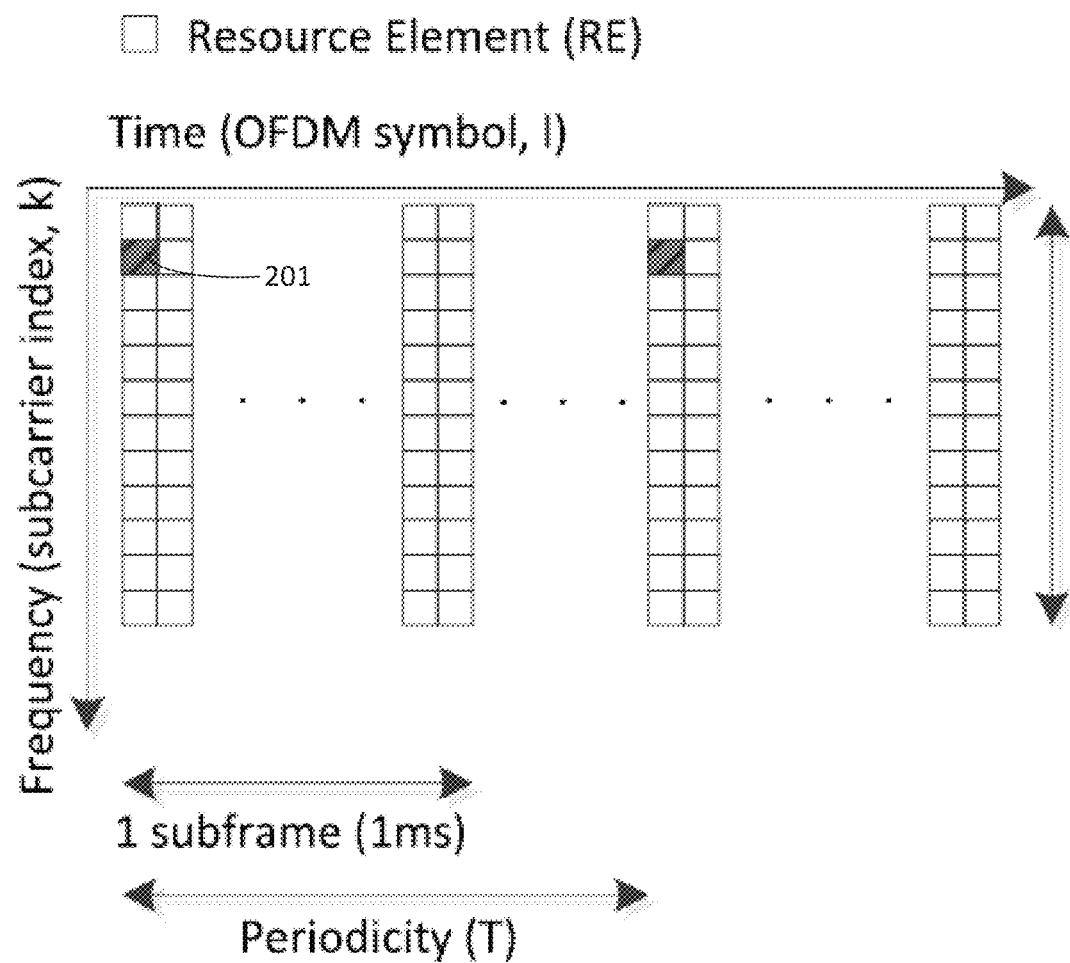
FIG. 2 illustrates an example of single tone transmission in accordance with some embodiments.

FIG. 2 illustrates an example of single tone transmission in accordance with some embodiments. In FIG. 2, a single tone transmission 201 can occur at subcarrier index k=1 with periodicity T. A given UE 101 (FIG. 1) or other equipment can use one subcarrier for transmission, while not using other subcarriers for transmission within the same OFDM symbol or SC-FDMA symbol duration. Single-tone transmissions can provide favorable Peak-to-Average Power Ratios (PAPR) and Cubic Metric (CM) properties based on signal fluctuation of the sinusoidal waveform of the single-tone transmission in the time domain. In embodiments that provide lower PAPR or CM, wider coverage can be provided at least because less power back-off is required in the Power Amplifier (PA). A UE 101 can use other subcarriers for transmission to other UEs 101, home eNodeBs 104, or other devices in a frequency division multiplexing (FDM) manner. Further, other subcarriers of an OFDM symbol or an SC-FDMA symbol can be assigned for other UEs 101, home eNodeBs 104, etc., to transmit single tone signals in a time division multiplexing (TDM) manner. The transmitted sub-carrier and/or periodicity can be configured or predetermined based on certain rules, e.g. based device identities (e.g. cell ID for home eNodeBs 104 or other small cells, UE ID for UEs 101 or D2D ID for D2D discovery).

Figure 3:
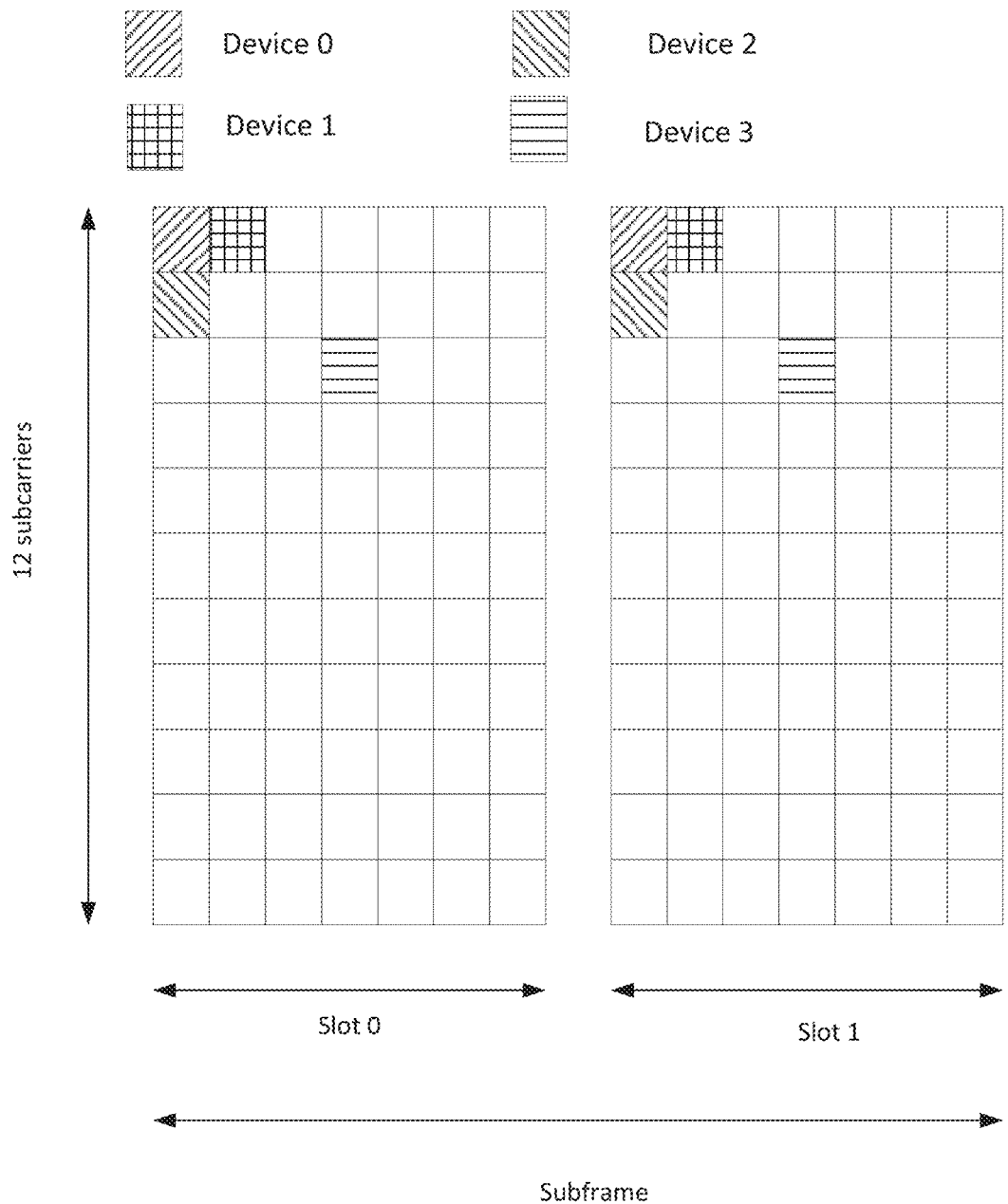
FIG. 3 illustrates an example of device multiplexing and frequency hopping in accordance with some embodiments.

Some embodiments may implement frequency hopping across slots may to achieve frequency diversity gains. FIG. 3 illustrates an example of device multiplexing and frequency hopping in accordance with some embodiments.

Some embodiments can implement frequency hopping in a mirrored hopping design for improved frequency diversity. For example, in the illustrative example of FIG. 3, if Device 0 transmits a signal in slot 0 in one physical resource block (PRB), device 0 may transmit the same signal in slot 0 of other PRBs available for transmission.

Receiver circuitry of UE 101, home eNodeB 104 or other unit that is to receive signals as described herein may perform a Fast Fourier Transform (FFT) algorithm to convert the time domain signal to the frequency domain signal, and perform a power measurement to detect the existence of a transmitted signal in a given OFDM symbol or SC-FDMA symbol.

Transmission by additional UEs 101 can be multiplexed in a given OFDM symbol or SC-FDMA symbol by allocating or assigning additional PRBs for UE 101 transmission. In an example, up to twelve UEs 101 can be multiplexed for simultaneous discovery signal transmission in one PRB assuming that all OFDM (or SC-FDMA) symbols within a slot can be used for single-tone transmission.

However, single-tone transmission may suffer from signal fading when the assigned single tone experiences deep fading. Further, at least because the assigned subcarrier for single tone transmission may be reused by another UE 101, home eNodeB 104, or other device, the likelihood of interference (e.g., collision) among transmissions can be high. Additionally, the transmitted energy, which can affect coverage area, is in accordance with the number of OFDM (or SC-FDMA) symbols for transmission, and therefore single-tone transmissions in current systems can exhibit elevated levels of transmitted energy.

Some embodiments can help overcome drawbacks related to deep fading or elevated energy levels by varying the frequency position k for single tone transmission at every transmission opportunity while maintaining single-carrier properties of low CM or PAPR. An assignment pattern at which frequency positions will vary can be predetermined, for example in specifications according to a standard of the 3rd Generation Partnership Project (3GPP) family of standards, or the assignment pattern can be configured in a Radio Resource Control (RRC) message, algorithm, etc. In some embodiments, the assignment pattern can be generated in a pseudo-random sequence (e.g. Gold sequence). Accordingly, even when a single-tone based signal falls into the deep fading in a certain transmission opportunity, deep fading can be overcome in another transmission opportunity with better channel conditions by exploiting frequency diversity.

Figure 4:
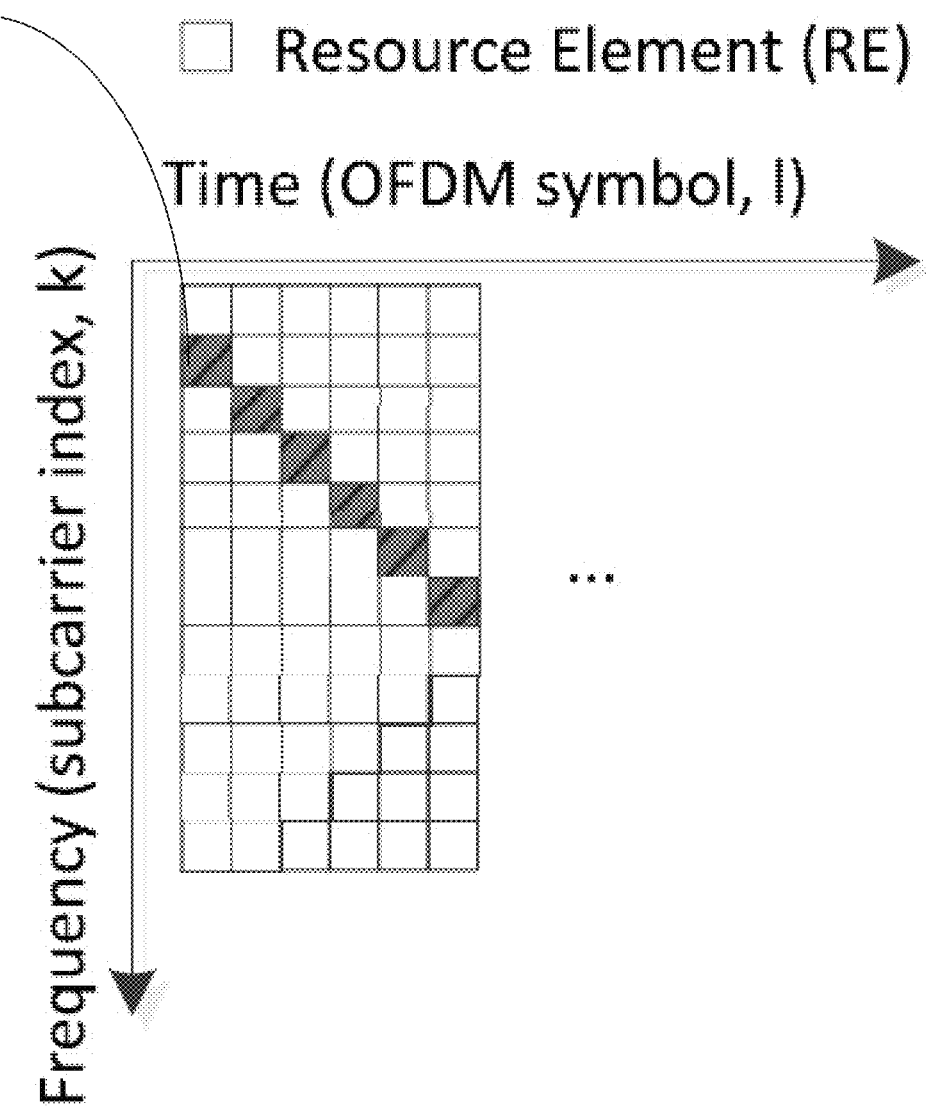
FIG. 4 illustrates an example of frequency varying transmission for single-tone in accordance with some embodiments.

FIG. 4 illustrates an example of frequency varying transmission for single-tone in accordance with some embodiments. The transmit position 401 can be represented within a PRB by:

$$r(k,l) = \mathrm{mod}(k+l+\mathrm{ID}, N_{SC}) \quad (1)$$

where k is the subcarrier index, l is the OFDM symbol index, ID is an identifier for the UE 101 or home eNodeB 104, or other unit performing the single-tone transmission, and $N_{SC}$ is the number of subcarriers within an assigned region (e.g. assigned PRB).

Figure 5:
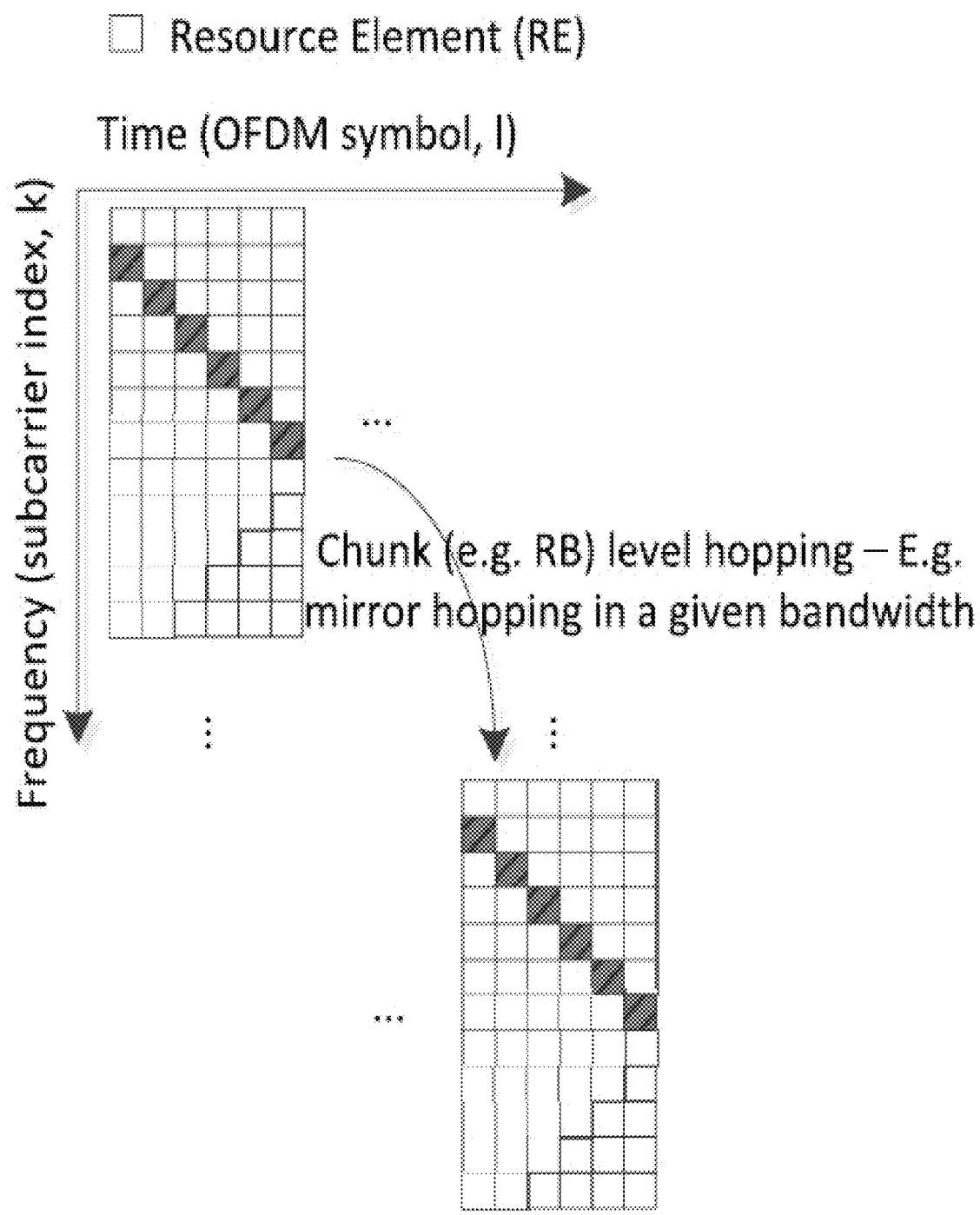
FIG. 5 illustrates an example of frequency varying transmission for single-tone that applies frequency hopping at the chunk or block level in accordance with some embodiments.

FIG. 5 illustrates an example of frequency varying transmission for single-tone that applies frequency hopping at the chunk or block level in accordance with some embodiments. In the illustrative example, a chunk/block may be equivalent to a PRB or a set of PRB s. Frequency hopping can occur across slots. For example, as illustrated in FIG. 5, the hopping pattern can be mirrored within the given bandwidth so that the maximum frequency diversity can be achieved. The discovery signal region can be defined at the edge of the given bandwidth.

Figure 6:
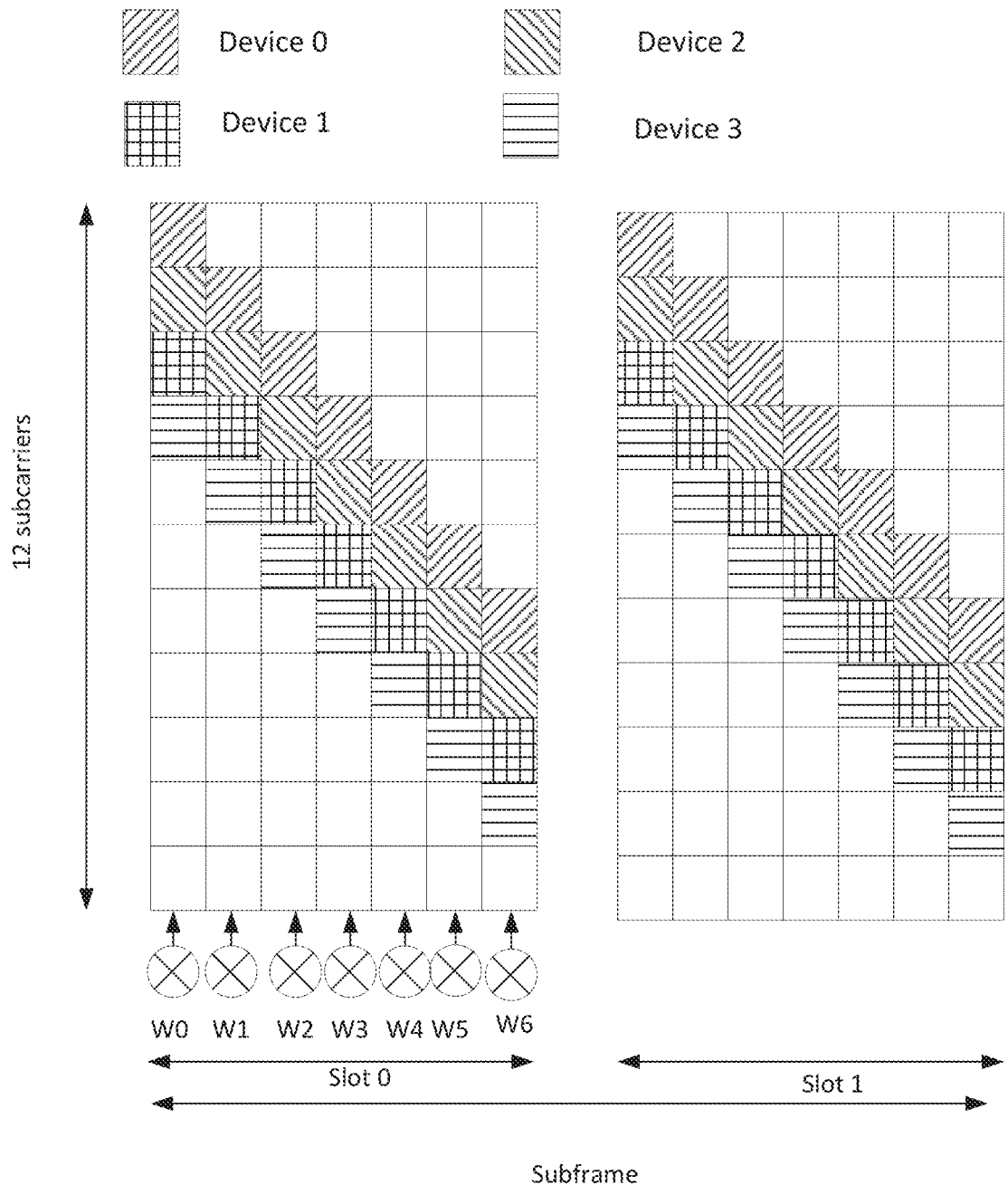
FIG. 6 illustrates an example of applying frequency varying single-tone with time domain OCC in accordance with some embodiments.

In embodiments described herein regarding FIGS. 3 and 5, the multiplexing capacity may be reduced. For example, the multiplexing capacities for the structures of FIG. 3 and of FIG. 5 within a PRB in normal cyclic prefix (NCP) are, respectively, 84 (=12 subcarriers times 7 symbols) and 12. Some embodiments increase multiplexing capacity and coverage (e.g., energy) by applying Orthogonal Code Cover (OCC), on each SC-FDMA symbol (or OFDM symbol). Some embodiments alternatively provide phase rotational sequence (e.g., cyclic shift) on each SC-FDMA or OFDM symbol. FIG. 6 illustrates an example of applying frequency varying single-tone with time domain OCC in accordance with some embodiments.

If a discrete Fourier transform code or phase rotational sequence is applied for OCC, the code can be expressed as $$W_n^k = e^{\frac{j2\pi k n}{N}} \quad (2)$$

where N=7, k=0 . . . 6, and n=0 . . . 6, and where it is understood by those of ordinary skill in the art that phase rotational sequence in the frequency domain is equivalent to cyclic shift operation in the time domain.

To overcome interference collision, in example embodiments, the single tone can be populated by the sequence generated by a predetermined pattern. The predetermined pattern may be generated, in some embodiments, by a pseudo-random sequence. In other embodiments, the populated sequence can be generated according to the Quadrature Phase-Shift Keying (QPSK)-based base sequence, which is currently defined in 3GPP TS 36.211 for demodulation reference signals (DM RS) and physical uplink control channels (PUCCH). The sequence length can be truncated in some embodiments, or otherwise adapted by cyclic extending one or more sequence elements. If the sequences are de-spread in a predictable fashion, the interference can be randomized from the spreading gain. Therefore, the discovery signal can be transmitted in one or more OFDM symbols (e.g., each OFDM symbol in a subframe) or SC-FDMA symbols, and the transmitted single-tones can be populated within a subframe or a slot of a subframe. The scrambled sequence can be binary phase-shift keying (BPSK)-based, QPSK-based, polynomial based, or complex value based.

An example of sequence population of single-tone transmission can be QPSK modulated signals generated by a pseudo random sequence (e.g., Gold Sequence). As an additional example, a sequence can be generated according to:

$$r_l = \frac{1}{\sqrt{2}}(1 - 2 \times c(0)) + j\frac{1}{\sqrt{2}}(1 - 2 \times c(1)) \quad (3)$$

where $c_{init}$=f(l,$n_S$,id), such that the generated pseudo random sequence is at least a function of OFDM symbol index l, slot number $n_S$, or ID of the home eNodeB 104, UE 101, D2D ID, group ID, etc.

Figure 7:
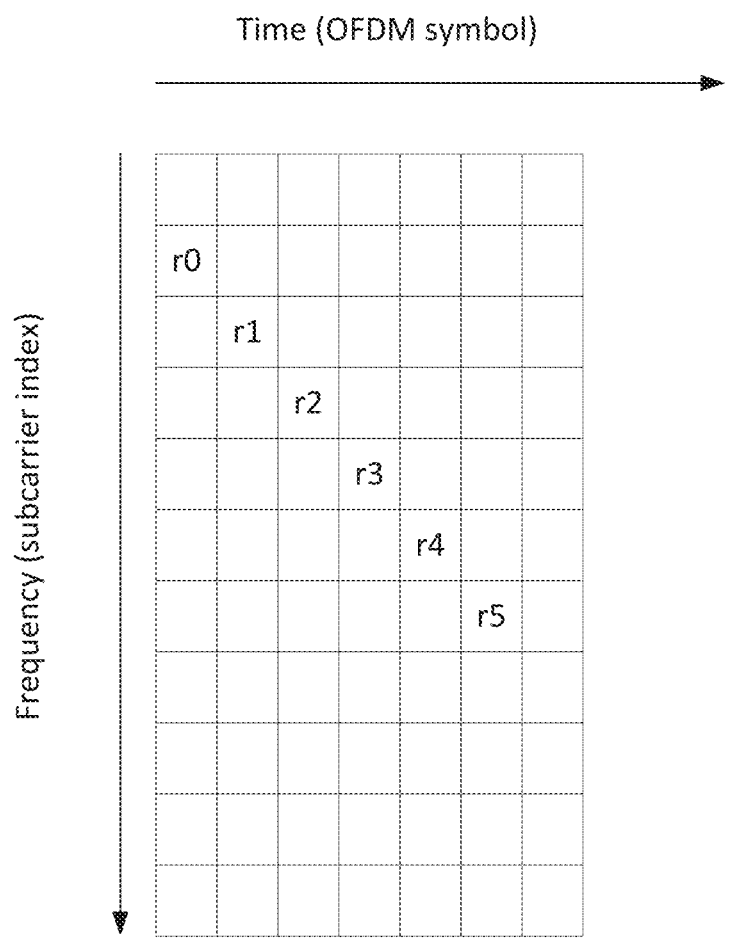
FIG. 7 illustrates an example of scrambling the single-tone based transmission in accordance with some embodiments.

FIG. 7 illustrates an example of scrambling the single-tone based transmission in accordance with some embodiments. It is noted that the scrambling on single tone transmission can be applied to other embodiments described herein.

Figure 8A:
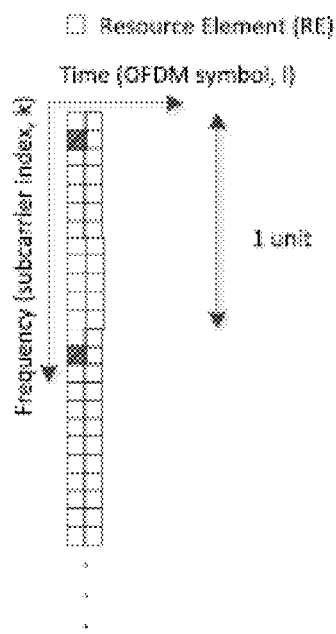
FIG. 8A illustrates an example for simple extensions with copy at a physical resource block level with position being unvarying in accordance with some embodiments.
Figure 8B:
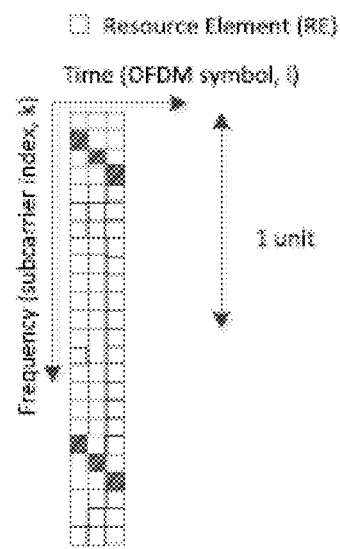
FIG. 8B illustrates an example for simple extensions with copy at a physical resource block level with position being varying in accordance with some embodiments.

In some embodiments, the concatenation of the multiple RBs (e.g., units) for single tone transmission can be conducted to capture more frequency samples. In some embodiments, the signal location for transmission may vary although embodiments are not limited thereto. FIG. 8A illustrates an example for simple extensions with copy and for the extension at a PRB level (e.g., 12 subcarriers) with position being unvarying within a unit, while FIG. 8B illustrates an example that includes the position varying within a unit.

Figure 9:
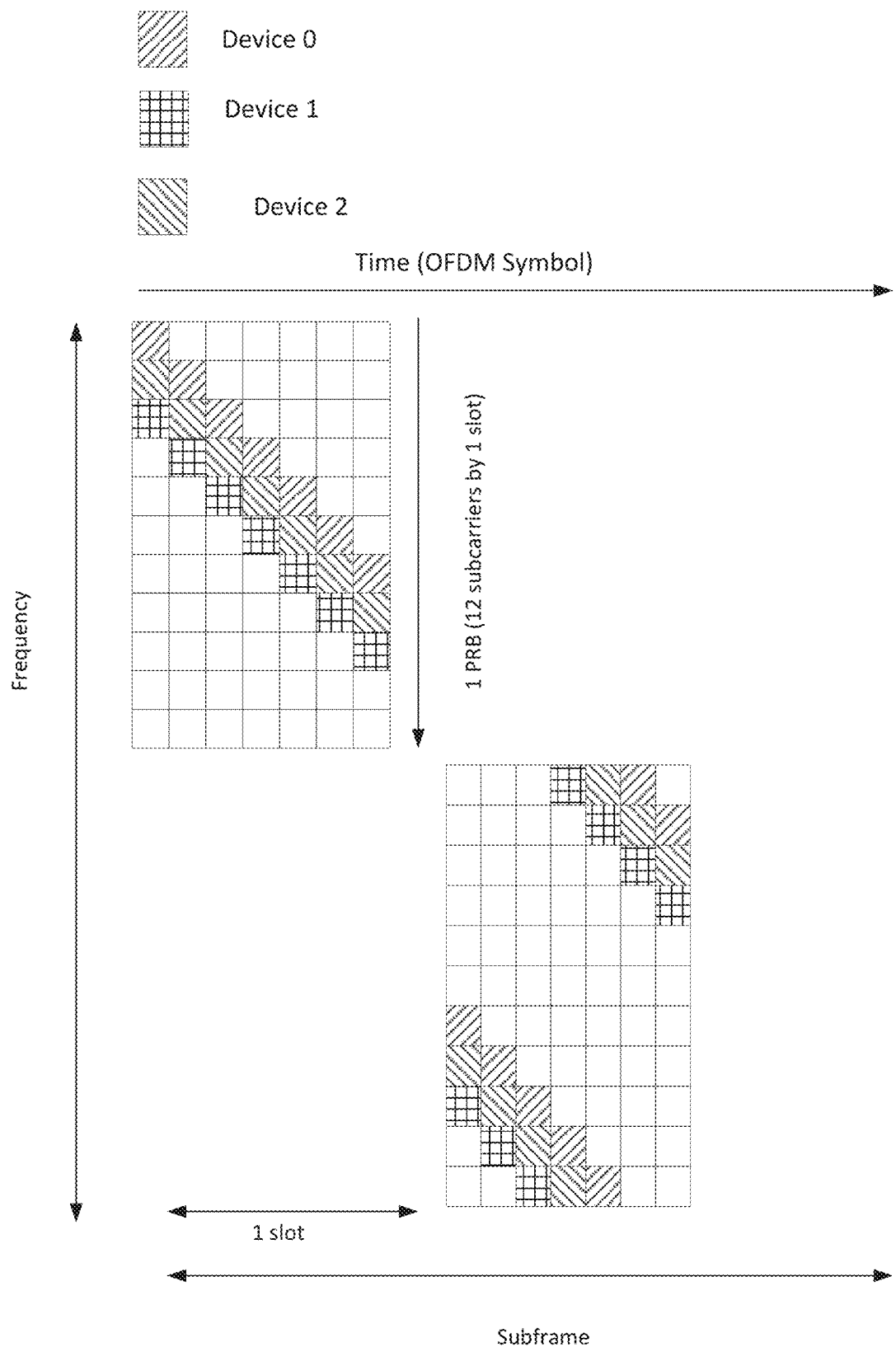
FIG. 9 illustrates an example of chunk level frequency hopping with pattern-shifting across slots in accordance with some embodiments.

FIG. 9 illustrates an example of chunk level frequency hopping with pattern-shifting across slots in accordance with some embodiments. According to some embodiments, coverage can be improved by transmitting signals in different OFDM (SC-FDMA) symbol. Further, in some embodiments, at every OFDM (SC-FDMA) symbol, one tone is used for transmission and the transmitted tone can vary from OFDM (SC-FDMA) symbol to OFDM (SC-FDMA) symbol. The transmitted tone location for a UE 101, home NodeB 104, or other device may be configured or predetermined according to device IDs (e.g. cell ID or device ID). The sequence modulation can be performed over the signal tone. The composition of the signals in a slot or a subframe in some embodiments covers the largest possible frequency range in the RB in order to provide improved auto-correlation profiles. Further, as shown in FIG. 9, the chunk/block (RB) level hopping can be performed in slot level. OCC can be applied to increase multiplexing capacity as described herein.

Figure 10:
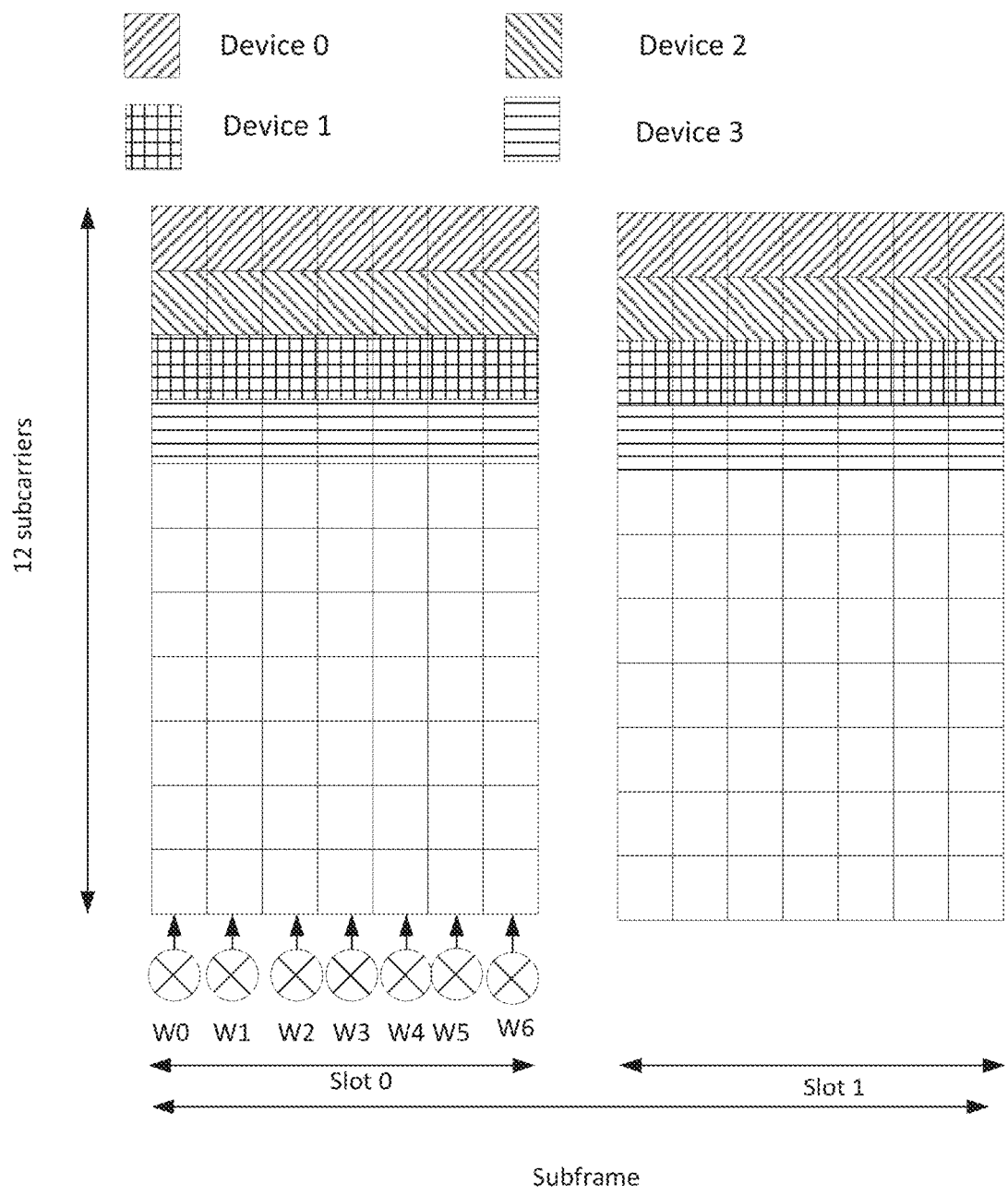
FIG. 10 illustrates single tone transmission spread across all OFDM symbols in a slot or subframe in accordance with some embodiments.

In some embodiments, the single tone can be spread out across more than one (e.g., all) OFDM symbols or SC-FDMA symbols within a slot or within a subframe as shown in FIG. 10. Additionally, OCC can be applied in these embodiments.

In some embodiments, mode configuration (e.g. by RRC signaling) between short (e.g., mode 1) and long (e.g., mode 2) range modes is provided. The discovery signal density of mode 2 can be higher (in the time domain) than mode 1 to support wider coverage. For instance, mode 1 can be used for the smaller range of the detection and mode 2 can be used for the wider range of the detection. There can be a trade-off between the multiplexing capacity and the coverage.

Figure 11:
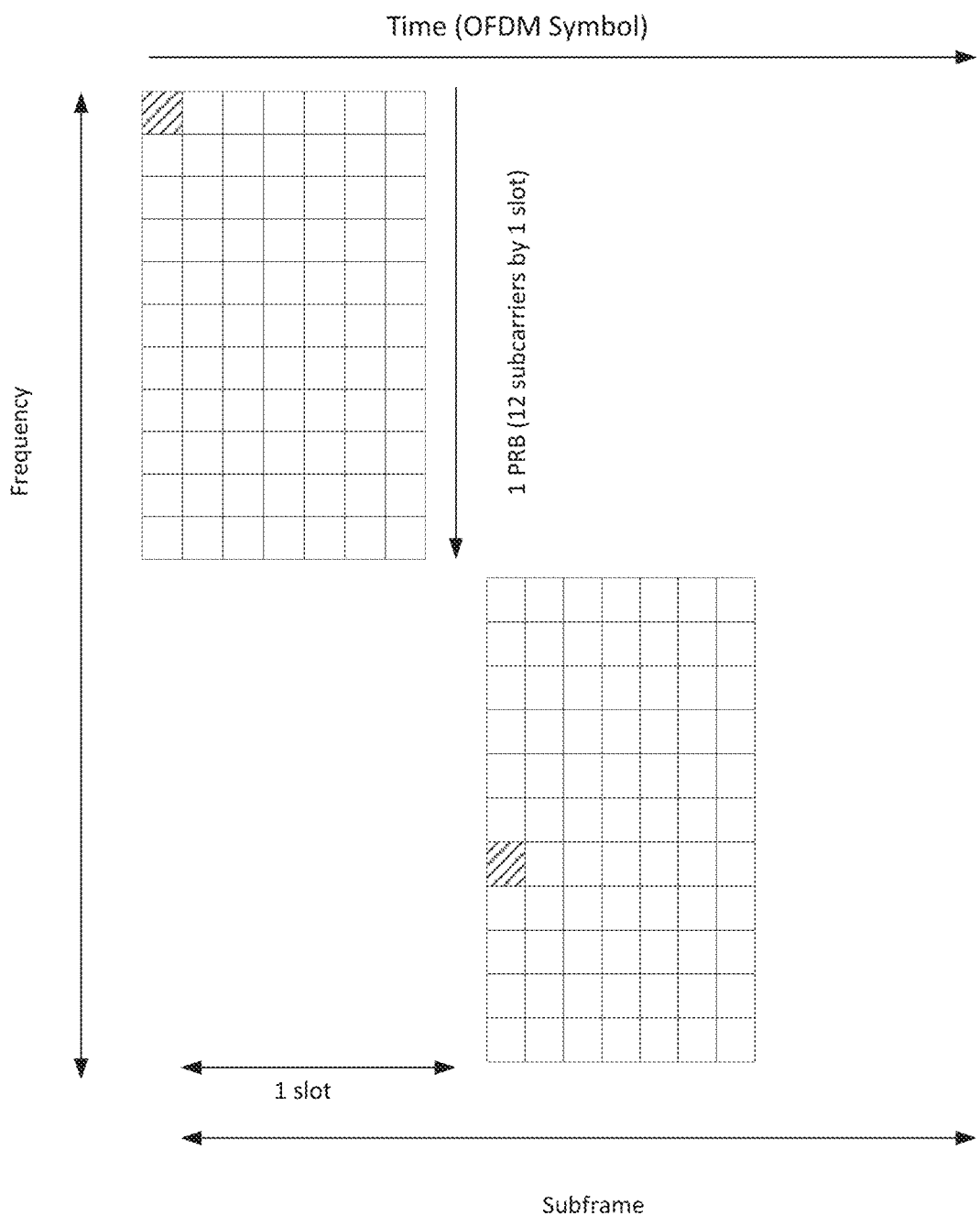
FIG. 11 illustrates an example of a short range discovery signal accordance with some embodiments.

FIG. 11 illustrates an example of mode 1 in accordance with some embodiments. FIG. 9 illustrates an example of mode 2 in accordance with some embodiments. The multiplexing capacity of mode 1 is 84 (=12*7) while that of mode 2 is 12. The larger coverage can be achieved with mode 2 with the cost of lower capacity.

Example Device for Implementing Embodiments

Figure 12:
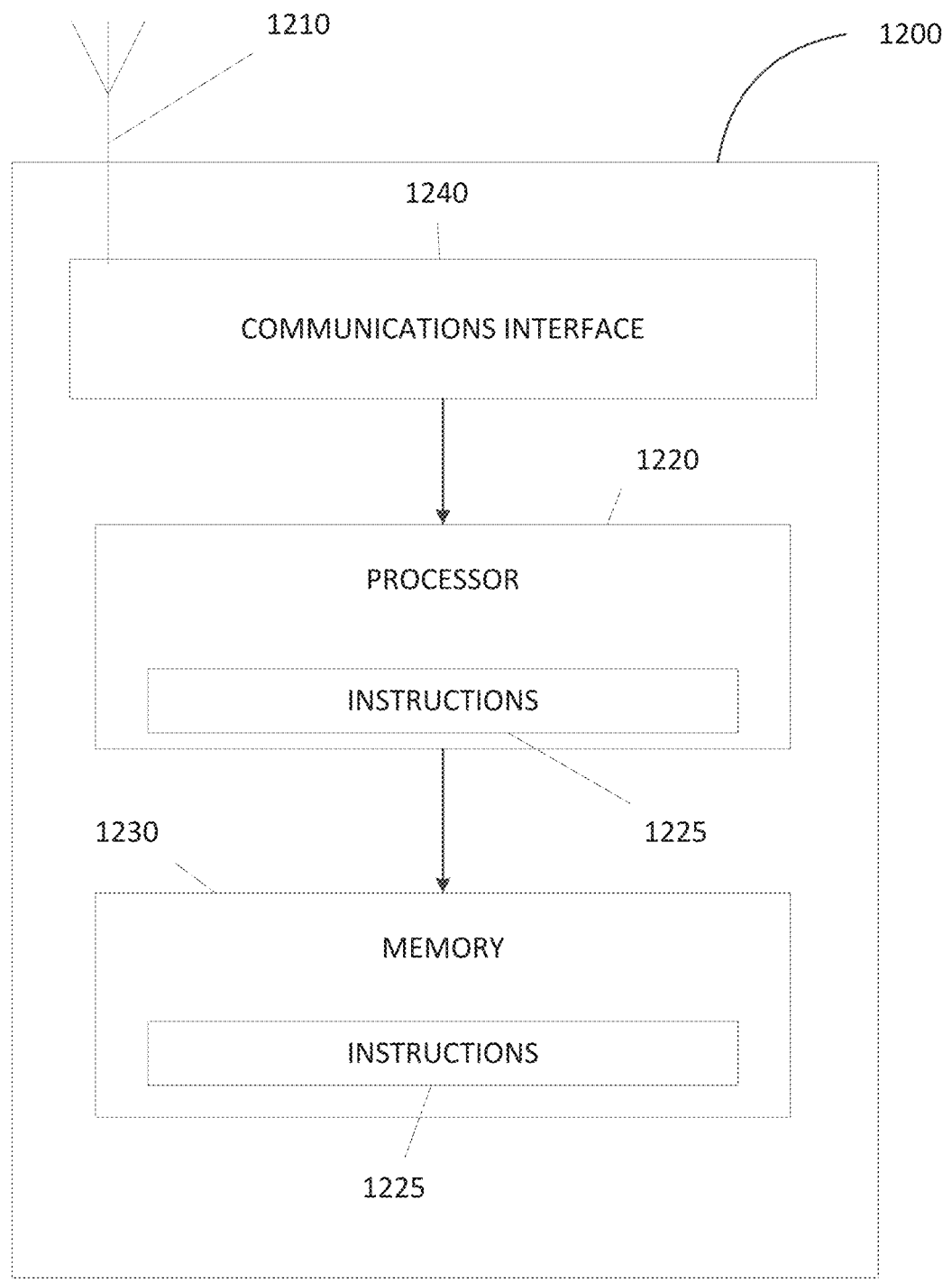
FIG. 12 shows an example block diagram of a user equipment (UE), according to some embodiments described herein.

FIG. 12 is a block diagram of the basic components of a UE 1200 in accordance with some embodiments. The UE 1200 may be suitable as a UE 101 (FIG. 1). The UE 1200 may support methods for single-tone based discovery signaling in accordance with embodiments described above with respect to FIG. 1-11.

The UE 1200 includes one or more antennas 1210 arranged to communicate with home eNodeB 104 (FIG. 1), or other types of wireless local area network (WLAN) access points. The UE 1200 further includes a processor 1220, instructions 1225, and a memory 1230. The UE 1200 may further include a communications interface 1240. In one embodiment, the memory 1230 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

The processor 1220 may include logic or code to enable the UE 1200 to process signals received from the network through the antenna 1210. The processor 1220 may include code or other instructions 1225 to allow the UE 1200 to configure a single-tone discovery signal for transmission in a symbol in a transmission opportunity based on an assignment pattern, the assignment pattern defining frequency positions, for a set of transmission opportunities, at which the apparatus shall transmit discovery signals in the corresponding transmission opportunity. The processor 1220 can retrieve the assignment pattern from a radio resource control (RRC) message defined in accordance with a standard of the 3GPP family of standards. The assignment pattern may be configured based on a rule in accordance with a standard of the 3GPP family of standards. The rule may be based on identification information or type information for the UE 1200.

The assignment pattern can define frequency positions in a first set of RBs for a first subset of the set of transmission opportunities, and in a second set of RBs for a second subset of the set of transmission opportunities. The first set of RBs can include at least one RB that is not included in the second set of RBs. The processor 1220 can apply an OCC algorithm or a phase rotational sequence algorithm to the symbol.

The instructions 1225 can allow the UE 1200 to determine that fading has occurred in a first symbol in a first transmission opportunity in which the UE 1200 has transmitted a discovery signal. The processor 1220 can then configure discovery information for transmission in a subsequent transmission opportunity and in a second symbol at a different frequency position than that of the first symbol, the second symbol being determined based on the assignment pattern.

Example embodiments allow a UE 1200 to transmit the single-tone discovery signal in the corresponding transmission opportunity using the communications interface 1240.

Example eNodeB for Implementing Embodiments

Figure 13:
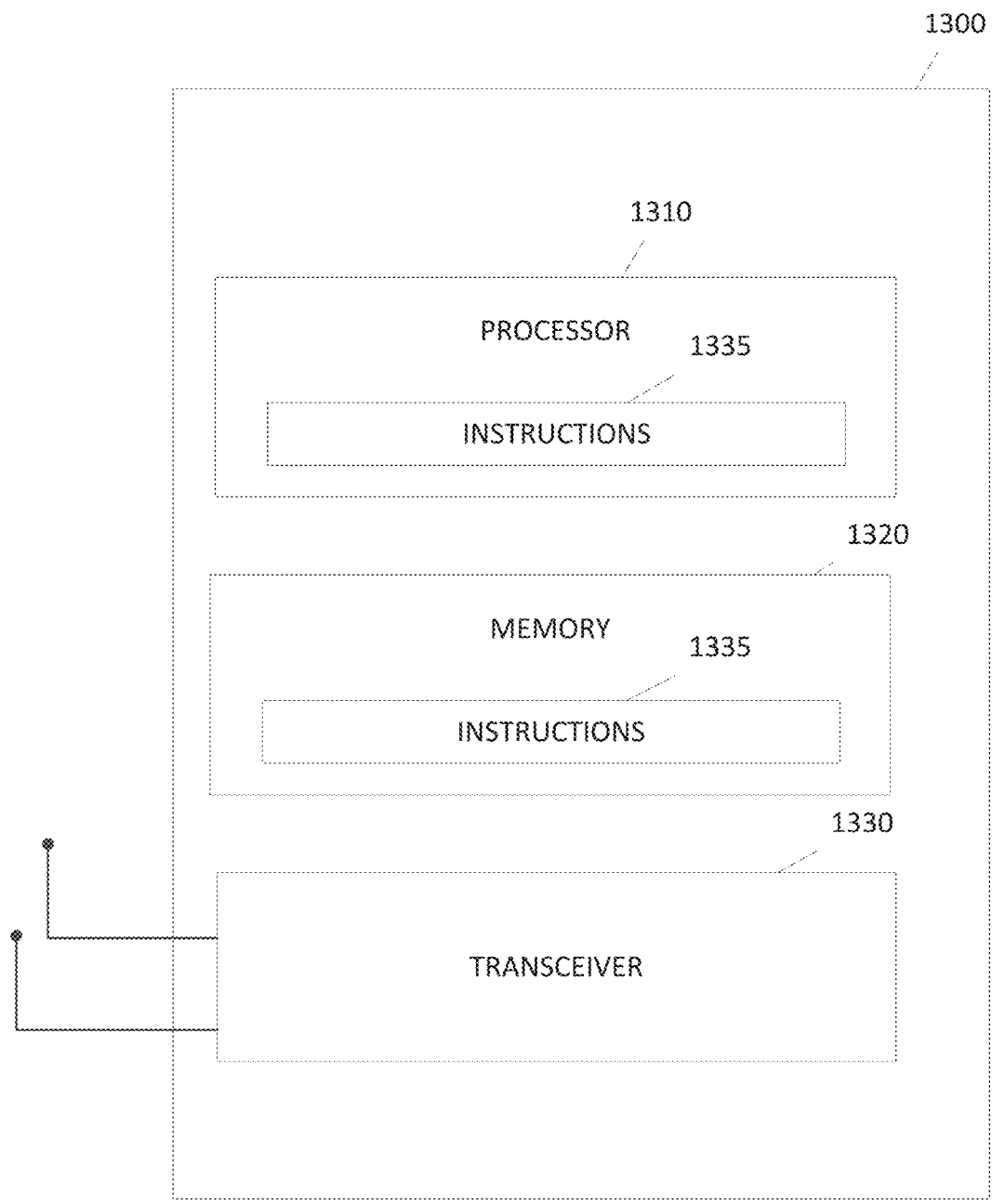
FIG. 13 is a block diagram showing details of an eNodeB according to some embodiments described herein.

FIG. 13 is a block diagram showing details of an eNodeB 1300 according to some embodiments. The eNodeB 1300 may be suitable as home eNodeB 104 (FIG. 1), eNodeB 102 (FIG. 1), etc. The eNodeB 1300 includes a processor 1310, a memory 1320, a transceiver 1330, and instructions 1335. The eNodeB 1300 may include other elements (not shown).

The processor 1310 comprises one or more central processing units (CPUs), graphics processing units (GPUs), or both. The processor 1310 provides processing and control functionalities for the eNodeB 1300. Memory 1320 comprises one or more transient and static memory units configured to store instructions 1335 and data for the eNodeB 1300.

The transceiver 1330 comprises one or more transceivers including a multiple-input and multiple-output (MIMO) antenna to support MIMO communications. The transceiver 1330 receives UL transmissions and transmits DL transmissions, among other things, from and to UE 101 (FIG. 1).

The processor 1310 can generate a first assignment pattern for discovery signal transmission by a UE 101 in a cell served by the eNodeB 1300. The first assignment pattern can define frequency positions, in transmission opportunities, at which the UE 101 is permitted to transmit discovery signals in a corresponding transmission opportunity. A transmission opportunity can include a number of frequency positions, and the processor 1310 can generate the first assignment pattern such that, in a time interval including a plurality of transmission opportunities, the UE 101 transmits a discovery signal at least once in each of the number of frequency positions. The processor 1310 can generate a second assignment pattern upon receiving an indication that additional UEs have entered the cell served by the eNodeB 1300. The second assignment pattern can include assignment information for each UE in the cell.

The transceiver can transmit a RRC signal to the UE 101 that includes information for the first assignment pattern.

The instructions 1335 comprise one or more sets of instructions or software executed on a computing device (or machine) to cause such computing device (or machine) to perform any of the methodologies discussed herein. The instructions 1335 (also referred to as computer- or machine-executable instructions) may reside, completely or at least partially, within the processor 1310 and/or the memory 1320 during execution thereof by the eNodeB 1300. The processor 1310 and memory 1320 also comprise machine-readable media.

As those of ordinary skill in the art will readily appreciate, various aspects described throughout this disclosure may be extended to other telecommunication systems, network architectures and communication standards. By way of non-limiting example, various aspects may be extended to other Universal Mobile Telecommunications System (UMTS) systems. Various aspects can be used in systems employing Long Term Evolution (LTE) (in FDD, TDD, or both modes), and LTE-Advanced (LTE-A) (in FDD, TDD, or both modes).

Examples, as described herein, may include, or may operate on, logic or a number of components, components, or mechanisms. Components are tangible entities capable of performing specified operations and may be configured or arranged in a certain manner. In an example, circuits may be arranged (e.g. internally or with respect to external entities such as other circuits) in a specified manner as a component. In an example, the whole or part of one or more computer systems (e.g. a standalone, client or server computer system) or one or more hardware processors may be configured by firmware or software (e.g. instructions, an application portion, or an application) as a component that operates to perform specified operations. In an example, the software may reside (1) on a non-transitory machine-readable medium or (2) in a transmission signal. In an example, the software, when executed by the underlying hardware of the component, causes the hardware to perform the specified operations.

Accordingly, the terms "component" and "component" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which components are temporarily configured, one instantiation of a component may not exist simultaneously with another instantiation of the same or different component. For example, where the components comprise a general-purpose hardware processor configured using software, the general-purpose hardware processor may be configured as respective different components at different times. Accordingly, software may configure a hardware processor, for example, to constitute a particular component at one instance of time and to constitute a different component at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those of ordinary skill in the art to practice them. Other embodiments may incorporate structural, logical, electrical, process, and other changes. Portions and features of some embodiments may be included in, or substituted for, those of other embodiments.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

We claim:

1. An apparatus comprising:
processing circuitry arranged to configure a single-tone discovery signal for transmission in one symbol and on one subcarrier in a transmission opportunity based on an assignment pattern, the assignment pattern defining patterns at which frequency positions shall vary, for a set of transmission opportunities, at which the apparatus shall transmit discovery signals in the corresponding transmission opportunity while maintaining single-carrier properties of low Cubic Metric (CM) or Peak-to-Average Power Ratios (PAPR); and
physical layer circuitry arranged to transmit the single-tone discovery signal in the corresponding transmission opportunity, wherein the processing circuitry retrieves the assignment pattern to be used for transmitting the single-tone discovery signal from a radio resource control (RRC) message defined in accordance with a standard of the 3rd Generation Partnership Project (3GPP) family of standards and wherein the processing circuitry is further arranged to apply an orthogonal code coverage (OCC) algorithm or a phase rotational sequence algorithm to the symbol.

2. The apparatus of claim 1, wherein the assignment pattern is configured based on a rule in accordance with the standard of the 3 GPP family of standards.

3. The apparatus of claim 2, wherein the rule is based on identification information or type information for the apparatus.

4. The apparatus of claim 1, wherein the assignment pattern defines the frequency positions in a first set of resource blocks (RBs) for a first subset of the set of the transmission opportunities, and in a second set of RBs for a second subset of the set of the transmission opportunities, the first set of RBs including at least one RB that is not included in the second set of RBs.

5. The apparatus of claim 1, wherein the processing circuitry is further arranged to determine that fading has occurred in a first symbol in a first transmission opportunity in which the apparatus has transmitted a discovery signal; and
configure discovery information for transmission in a subsequent transmission opportunity and in a second symbol at a different frequency position than that of the first symbol, the second symbol being determined based on the assignment pattern.

6. A home NodeB for coordinating communication within a cell served by the home NodeB, the home NodeB comprising:
processing circuitry arranged to generate a first assignment pattern for discovery signal transmission by a user equipment (UE) in the cell, the first assignment pattern defining patterns at which frequency positions shall vary, in transmission opportunities, at which the UE is permitted to transmit discovery signals in one symbol and on one subcarrier in a corresponding transmission opportunity while maintaining single-carrier properties of low Cubic Metric (CM) or Peak-to-Average Power Ratios (PAPR); and
transceiver circuitry arranged to transmit a radio resource control (RRC) signal that includes information for the first assignment pattern, wherein the processing circuitry is further arranged to apply an orthogonal code coverage (OCC) algorithm or a phase rotational sequence algorithm to the symbol.

7. The home NodeB of claim 6, wherein a transmission opportunity includes a number of the frequency positions, and the processing circuitry generates the first assignment pattern such that, in a time interval including a plurality of the transmission opportunities, the UE transmits a discovery signal at least once in each of the number of frequency positions.

8. The home Node B of claim 6, wherein the processing circuitry is further arranged to generate a second assignment pattern upon receiving an indication that additional UEs have entered the cell, the second assignment pattern including assignment information for each UE in the cell.

9. A method for device discovery performed by an apparatus in a wireless communication network, the method comprising:
configuring a single-tone discovery signal for transmission in one symbol and on one subcarrier in a transmission opportunity based on an assignment pattern, the assignment, pattern defining patterns at which frequency positions shall vary, for a set of transmission opportunities, at which the apparatus shall transmit discovery signals in the corresponding transmission opportunity while maintaining single-carrier properties of low Cubic Metric (CM) or Peak-to-Average Power Ratios (PAPR); and
transmitting the single-tone discovery signal in the corresponding transmission opportunity, wherein the assignment pattern is retrieved from a radio resource control (RRC) message defined in accordance with a standard of the 3rd Generation Partnership Project (3 GPP) family of standards and further comprising applying an orthogonal code coverage (OCC) algorithm or a phase rotational sequence algorithm to the symbol.

10. The method of claim 9, wherein the assignment pattern is configured based on a rule in accordance with the standard of the 3 GPP family of standards.

11. The method of claim 10, wherein the rule is based on identification information or type information for the apparatus.

12. The method of claim 9, wherein the assignment pattern defines the frequency positions in a first set of resource blocks (RBs) for a first subset of the set of the transmission opportunities, and in a second set of RBs for a second subset of the set of the transmission opportunities, the first set of RBs including at least one RB that is not included in the second set of RBs.

13. The method of claim 9, further comprising:
determining that fading has occurred in a first symbol in a first transmission opportunity in which the apparatus has transmitted a discovery signal; and
configuring discovery information for transmission in a subsequent transmission opportunity and in a second symbol at a different frequency position than that of the first symbol, the second symbol being determined based on the assignment pattern.

* * * * *

UNITED STATES PATENT AND TRADEMARK OFFICE
CERTIFICATE OF CORRECTION

| | | |
|---|---|---|
| PATENT NO. | : 9,647,818 B2 | Page 1 of 1 |
| APPLICATION NO. | : 14/142021 | |
| DATED | : May 9, 2017 | |
| INVENTOR(S) | : Han et al. | |

It is certified that error appears in the above-identified patent and that said Letters Patent is hereby corrected as shown below:

On the Title Page

Page 2, in Column 2, Item (56), under "Other Publications", Line 43, delete "Qualcomrn" and insert --Qualcomm-- therefor Signed and Sealed this
Twenty-first Day of April, 2020

Andrei Iancu
*Director of the United States Patent and Trademark Office*